United States Patent Office.

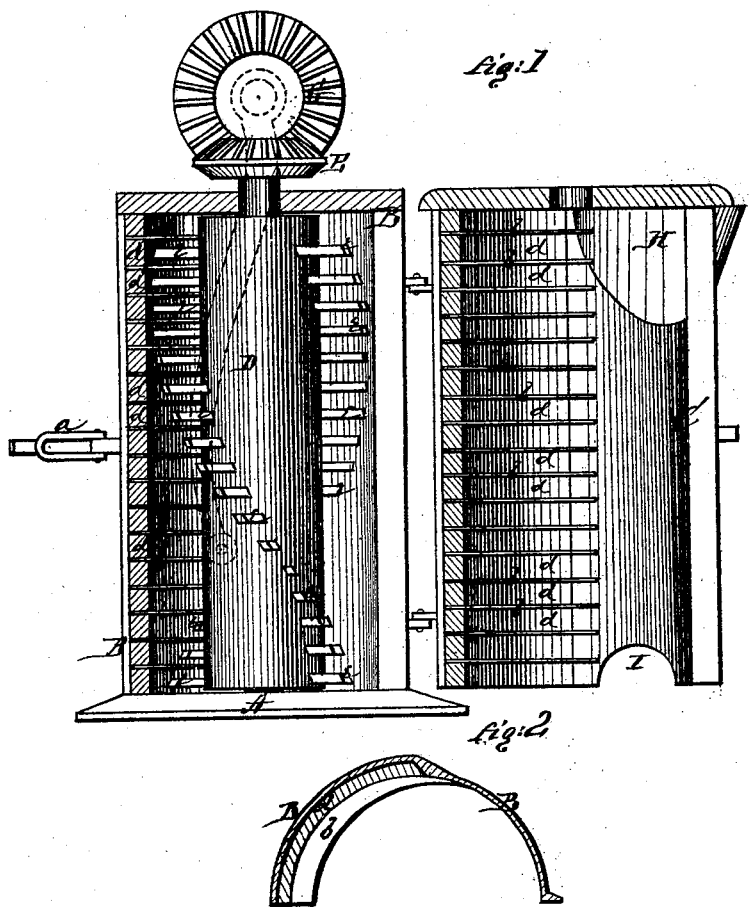

JEREMIAH S. ARTLEY, OF DANVILLE, PENNSYLVANIA.

Letters Patent No. 110,721, dated January 3, 1871.

IMPROVEMENT IN MEAT-CUTTERS.

The Schedule referred to in these Letters Patent and making part of the same.

*To all whom it may concern:*

Be it known that I, JEREMIAH S. ARTLEY, of Danville, in the county of Montour and in the State of Pennsylvania, have invented certain new and useful Improvements in Machine for Cutting Meat; and do hereby declare that the following is a full, clear, and exact description thereof, reference being had to the accompanying drawing and to the letters of reference marked thereon making a part of this specification.

The nature of my invention consists in the construction and arrangement of a "machine for cutting or grinding sausage-meat," as will be hereinafter fully set forth.

In order to enable others skilled in the art to which my invention appertains to make and use the same, I will now proceed to describe its construction and operation, referring to the annexed drawing, in which—

Figure 1 is a view of my machine open, to show the internal arrangement; and

Figure 2 is a horizontal section of a portion of the outside casing.

A represents the base of my machine, which is to be secured by bolts or screws to a table, bench, or other suitable support.

On the base A is placed a casing formed of two halves, one-half, B, being secured to the base or bed-piece; and the other half, C, is hinged to the former, forming the door. This part, when closed, is further secured by the clasp $a$, as shown in fig. 1, or other suitable means.

The main form of the casing B C is cylindrical, but each half has an enlargement, as shown in fig. 2, in which are inserted the knives $b\ b$, separated by means of blocks $d\ d$, said knives extending for a little more than one-half the inner circumference of each part B or C.

Through the center of the casing B C passes a cylinder, D, the journals of which have their bearings in the base A and in the top of the casing. This cylinder I propose to make hollow, for the purpose of lightening the machine; and from its outside project two or more series of spikes, $e\ e$, arranged in spiral form, as shown.

On the upper journal of the cylinder D is a miter-wheel, E, which gears with a similar wheel, G, on a crank-shaft, whereby the cylinder receives or obtains its rotating motion.

The meat is put into the casing at the top through a spout, H, formed on the part C, and is cut or ground by being brought in contact with the knives $b\ b$, by means of the revolving spiked cylinder D, and passes out through the aperture I at the lower end of the part C.

Having thus fully described my invention,

What I claim as new, and desire to secure by Letters Patent, is—

The combination, with the base A, of the vertically-placed and centrally-hinged casing B C, with enlargements $d$ and knives $b$, and the vertically-placed cylinder D and knives $e$, operated by means of the wheels E G, all as shown and described.

In testimony that I claim the foregoing I have hereunto set my hand this 23d day of August, 1870.

JEREMIAH S. ARTLEY.

Witnesses:
 JONAS E. RAUCH,
 JOHN S. BURKHART.